US011299394B2

(12) United States Patent
Schimek et al.

(10) Patent No.: US 11,299,394 B2
(45) Date of Patent: Apr. 12, 2022

(54) METHOD FOR PRODUCING NANOPARTICLES FROM A LIQUID MIXTURE

(71) Applicant: TECHNISCHE UNIVERSITÄT BERLIN, Berlin (DE)

(72) Inventors: Sebastian Schimek, Berlin (DE); Christian Oliver Paschereit, Berlin (DE); Moritz Sieber, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 162 days.

(21) Appl. No.: 16/494,695

(22) PCT Filed: Mar. 16, 2018

(86) PCT No.: PCT/EP2018/056691
§ 371 (c)(1),
(2) Date: Oct. 14, 2019

(87) PCT Pub. No.: WO2018/167281
PCT Pub. Date: Sep. 20, 2018

(65) Prior Publication Data
US 2020/0231438 A1  Jul. 23, 2020

(30) Foreign Application Priority Data
Mar. 17, 2017  (DE) ............... 10 2017 204 488.8

(51) Int. Cl.
| | |
|---|---|
| *C01B 13/34* | (2006.01) |
| *B01J 10/00* | (2006.01) |
| *B01J 19/26* | (2006.01) |
| *C01B 33/18* | (2006.01) |
| *C01F 7/30* | (2006.01) |
| *C01G 9/03* | (2006.01) |
| *C01G 23/07* | (2006.01) |
| *C01G 45/02* | (2006.01) |
| *C01G 49/06* | (2006.01) |
| *C01F 7/304* | (2022.01) |

(52) U.S. Cl.
CPC ............. *C01B 13/34* (2013.01); *B01J 10/00* (2013.01); *B01J 19/26* (2013.01); *C01B 33/183* (2013.01); *C01F 7/304* (2013.01); *C01G 9/03* (2013.01); *C01G 23/07* (2013.01); *C01G 45/02* (2013.01); *C01G 49/06* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | | |
|---|---|---|---|
| 3,642,441 A | 2/1972 | Van Weert | |
| 8,182,573 B2 | 5/2012 | Stark et al. | |
| 2004/0156773 A1 | 8/2004 | Kutsovsky | |
| 2006/0162497 A1 | 7/2006 | Kodas et al. | |
| 2008/0131350 A1 | 6/2008 | Burkes et al. | |
| 2008/0152583 A1 | 6/2008 | Jager et al. | |
| 2009/0202427 A1 | 8/2009 | Katusic et al. | |
| 2010/0102700 A1 | 4/2010 | Jaiswal et al. | |
| 2010/0304143 A1 | 12/2010 | Seeber et al. | |
| 2015/0141240 A1* | 5/2015 | Roller .................... | B01J 23/468 502/337 |

FOREIGN PATENT DOCUMENTS

| | | |
|---|---|---|
| EP | 1889810 A1 | 2/2008 |
| EP | 2 390 000 A1 | 11/2011 |
| WO | 2006/079633 A2 | 8/2006 |

OTHER PUBLICATIONS

Teoh, W.Y. et al., "Flame spray pyrolysis: An enabling technology for nanoparticles design and fabrication," Nanoscale, vol. 2, pp. 1324-1347, (Aug. 2010).
Rosebrock, C.D. et al., "The role of microexplosions in flame spray synthesis for homogeneous nanopowders from low-cost metal precursors," AIChe, The Global Home of Chemical Engineers, vol. 62, Issue 2, pp. 381-391, (Feb. 2016).

* cited by examiner

*Primary Examiner* — Anthony J Zimmer
(74) *Attorney, Agent, or Firm* — Maschoff Brennan

(57) ABSTRACT

A process for the production of nanoparticles from a liquid mixture comprising at least one precursor and at least one solvent in a reactor with continuous through-flow comprises the steps of feeding at least one oxygen-containing gas inflow stream having a temperature into the at least one reactor, adding at least one fuel having a temperature to the oxygen-containing gas inflow stream, wherein the fuel and the oxygen-containing gas inflow stream form a homogeneous ignitable mixture having a temperature, wherein the temperature of the homogeneous ignitable mixture is above the autoignition temperature of the homogeneous ignitable mixture, introducing at least one precursor-solvent mixture into the homogeneous ignitable mixture; autoignition of the ignitable mixture of oxygen-containing gas and fuel after an ignition delay time to form a stabilized flame and reacting the precursor-solvent mixture in the stabilized flame to form nanoparticles from the metal salt precursor, removing the formed nanoparticles.

13 Claims, 1 Drawing Sheet

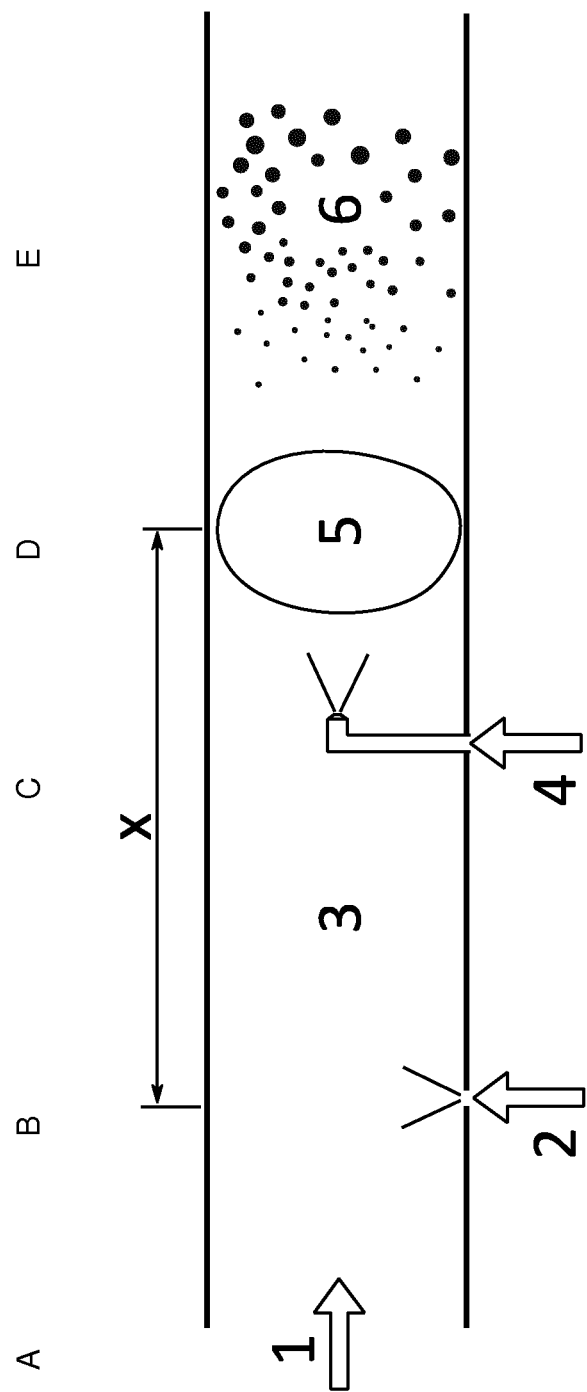

METHOD FOR PRODUCING NANOPARTICLES FROM A LIQUID MIXTURE

CROSS-REFERENCE TO A RELATED APPLICATION

This application is a National Phase Patent Application of International Patent Application Number PCT/EP2018/056691, filed on Mar. 16, 2018, which claims priority of German Patent Application Number 10 2017 204 488.8, filed on Mar. 17, 2017.

BACKGROUND

The present disclosure relates to a process for producing nanoparticles from a liquid mixture comprising a precursor and to a solvent and to a reactor for the execution of such a process.

The synthesis of specific nanomaterials by the atomization of solutions of suitable precursor mixtures and subsequent combustion of the spray has high potential. It allows the gas-phase production of complex and highly pure nanomaterials in the off-gas of the flame in a continuous process based on inexpensive starting substances. Through the spray process, it is possible for a wide range of chemical elements to be used and combined. This distinguishes the flame-spray process appreciably from the industrially established production of particles in gas flames.

Appropriate process design permits the successful production of materials having defined composition, particle size and morphology even beyond the limits of thermodynamic stability and thus outside the spectrum of materials achievable through liquid-phase synthesis processes. With the combustion of a spray, nanoscopic mixtures and composites of different material systems likewise can be obtained. Such materials are of great practical and commercial interest in a wide range of applications, e.g. industrial catalysis, battery storage, and photovoltaics.

Thus, US 2006/0162497 A1 describes the production of nanoparticles in a flame-spray system in which a precursor medium comprising a liquid phase (organic, aqueous or a mixture thereof) and a non-gaseous component is introduced into a flame reactor, e.g. by spraying. The populations of nanoparticles thus generated have a narrow particle-size distribution.

The feasibility in principle of flame-spray synthesis has been demonstrated in a large number of experiments and publications (see Teoh et al., Flame spray pyrolysis, Nanoscale, 2010, 2, 1324-1347). Studies have additionally demonstrated a high potential for previously unexplored materials. However, the transfer to industrial scale and associated use of highly attractive materials in products with large-scale use has thus far taken place only to a limited degree.

A challenge in the synthesis of nanoparticles by flame-spray methods is that practical applications require the distribution of particle size and morphology to be as low as possible (monodispersity). This can be achieved in the production process only if conditions are very homogeneous. In particular, the temperature-time history must show high similarity for all particles. On a laboratory scale this is usually achieved with the aid of laminar flames.

For large industrial scale use, in which large amounts of hundreds of kg of particles per day need to be produced inexpensively, the use of laminar spray flames is not realistic. The requisite high substance turnovers through one or a small number (<1000) of nozzles in a reactor mean that relatively high Reynolds numbers are unavoidable, thereby giving rise to a turbulent flow field. Both the turbulence and also the high velocities result in increased material exchange (turbulent diffusion) here, which fundamentally changes the combustion kinetics and flow dynamics. For example, the turbulent flame velocity is normally an order of magnitude higher than the laminar flame velocity and the flow field characterized by turbulent viscosity differs considerably from the laminar flow examined previously. The objective of the proposed solution is for there to be an approximately one-dimensional flow in the reactor despite these constraints, which also makes possible the stable process conditions described hereinafter.

A major problem in the large industrial scale application of this technology is the stabilization of the flame. Large material flows are by definition associated with high velocities in the reactor. In industrial combustion systems for other applications, powerful flames are often swirl-stabilized.

This means that the swirl of the flow gives rise to so-called recirculation zones, or backflow areas. These ensure that the fresh reactants are mixed with recirculating off-gas, which not only is at very high temperature, but also still contains reaction intermediates such as radicals. This recirculation results in ignition of the fresh reactants and thus to stabilization of the flame by the swirl.

This approach is unsuitable for the flame-spray synthesis of nanoparticles, since recirculation of part of the off-gas would result in substantial inhomogeneity in the residence time distribution of the precursor material in the immediate vicinity of the hot reaction zone. This would lead to substantial scatter in the temperature-time history and thus in the size distribution of the particles generated.

The various ignition mechanisms are summarized below:
  i) In a laminar flame, the reactants are largely brought to chemical reaction by the temperature and active intermediates (radicals) diffusing upstream from the reaction zone, i.e. into the unburned fuel-oxidizer mixture.
  ii) In turbulent flames or in flames with off-gas recirculation, the reactants likewise ignite through mixing of the reactants with the hot off-gas (high temperature and active intermediates). However, mixing is in this case based not exclusively on viscous diffusion, but also on turbulent transport processes (turbulent diffusion).
  iii) A further option for the ignition of a fuel-oxidizer mixture is to heat this mixture beyond the autoignition temperature. The chemical reaction (autoignition) commences after a characteristic ignition delay time, depending on the temperature and exact composition of the mixture.

The autoignition process can be explained as follows. When a fuel-oxidizer mixture is heated above the autoignition temperature, initial intermediates start to form from the combustion reactants, which in turn initiate further reactions, with the release of additional heat through the formation of combustion products. This is accompanied by an exponential rise in temperature until a large proportion of the combustion products has reacted and the flame temperature is at its maximum. The timescale on which this chain reaction occurs is characterized by the ignition delay time, which is the time interval from reaching the autoignition temperature to the observation of luminescence in the flame. The ignition delay time decreases with higher temperatures and also depends on the composition of the mixture. The ignition delay time can be in the range of microseconds to seconds.

Autoignition finds widespread industrial use in diesel engines, with the ignition temperature being achieved by the heating during compression of the fuel-air mixture in the piston. In gasoline engines, on the other hand, it is responsible for the undesirable knocking of the engine, which is in turn prevented by adjusting the octane number of the fuel.

The use of autoignition of mixtures of a fuel and a suitable precursor in the production of metal nitride and metal oxide powders is described, for example, in US 2008/0131350 A1. However, this process is not suitable for large industrial scale use, since the apparatus described does not allow large throughputs.

SUMMARY

The object underlying the proposed solution is thus to overcome the described disadvantages and to provide a process for the production of monodisperse nanoparticles that is suitable for large industrial scale production.

This object is achieved by a process for producing nanoparticles as described herein and a reactor for the execution of such a process having features as described herein.

A process is accordingly provided for the production of nanoparticles from at least one precursor and at least one solvent in a reactor with continuous through-flow, which comprises the following steps:
a) feeding at least one oxygen-containing gas inflow stream (I) having a temperature $T_I$ into the at least one reactor,
b) adding at least one fuel (F) having a temperature $T_F$ to the oxygen-containing gas inflow stream, wherein the fuel and the oxygen-containing gas inflow stream form a homogeneous ignitable mixture (IM) having a temperature $T_{IM}$, wherein the temperature of the homogeneous ignitable mixture $T_{IM}$ is above the autoignition temperature TAN of the homogeneous ignitable mixture,
c) introducing at least one precursor-solvent mixture into the homogeneous ignitable mixture (IM);
d) autoignition of the ignitable mixture (IM) of oxygen-containing gas and fuel after an ignition delay time $t_{ID}$ to form a stabilized flame and evaporating/burning the precursor-solvent mixture in the stabilized flame to form nanoparticles from the precursor, and
e) removing the nanoparticles formed from the reactor.

A process for the synthesis of nanoparticles is therefore provided in which a flame is stabilized at a fixed position in a reactor with continuous through-flow by precise adjustment of the process parameters. The stabilization of the flame is based here on the principle of autoignition and can be controlled through the ignition delay time.

To achieve this, an oxygen-containing gas that has been preheated to a predefined temperature $T_I$ is initially fed in at a reactor inlet (step a). The type of preheating of the gas at the inlet is not an important element of the process and may be effected for example by a preflame, electric heating, heat exchanger or similar.

To the hot oxygen-containing gas stream is added in step b) a fuel, for example a gaseous fuel, which is introduced such that the fuel mixes very rapidly with the gas to form a homogeneous mixture. Here it is essential that, after a short time or short travel distance in the reactor, there is always a homogeneous mixture of oxygen-containing gas and fuel present.

The resulting homogeneous mixture of oxygen-containing gas and fuel forms an ignitable mixture. Although the temperature of the resulting ignition mixture is also above the autoignition temperature of the mixture, combustion of the mixture occurs only after the ignition delay time $t_{ID}$ has elapsed. The ignition delay time is essentially determined by the composition of the mixture and its temperature. This can be controlled through a suitable choice of fuel-oxygen ratio and temperature.

In step c), the introduction, for example injection, of the precursor-solvent mixture into the homogeneous ignitable mixture (IM) takes place.

The autoignition in step d) of the ignitable mixture (IM) comprising oxygen-containing gas and fuel takes place after an ignition delay time $t_{ID}$, to form a stabilized flame.

The ignition delay time $t_{ID}$ depends on the chemical properties of the fuel. The rates of reaction and heat release of the individual reaction pathways are key factors in determining the time taken by the reactions. In addition, the ignition delay time is influenced by the properties of the oxygen-containing gas inflow stream, in particular temperature, composition (such as radicals present from a preflame, proportions of inert gases due to preflame, such as $H_2O$, $CO_2$ content) and/or pressure. These gas inflow stream parameters are matched to one another such that the product of the ignition delay time and flow velocity defines a fixed distance between fuel injection and the position in the reactor at which the flame is stabilized by autoignition. The key control variables that are used to set the ignition delay time and thus a stable operating point for the reactor are mass flows and temperatures of the inflow streams. Of particular importance are the choice of fuel gas, the temperature of the mixture, and the oxygen-fuel ratio.

The autoignition process is very complex. When mixtures are burned, hundreds of reaction pathways of intermediate products are accordingly possible. Variation of parameters such as temperature, pressure or the proportion of inert gases changes not only the reaction rate, but—under certain circumstances—the preferred reaction pathway too. Trends such as the decrease in the ignition delay time with increasing temperature can sometimes be reversed by this. Each possible mixture must therefore be considered separately.

Accordingly, in one embodiment of the present process, the autoignition of the ignition mixture of oxygen-containing gas and fuel takes place with an ignition delay time $t_{ID}$ that depends on the flow velocity v and temperature of the inflow stream $T_G$. The ignition delay time $t_{ID}$ may be in a range between 1 μs to 1 s, preferably 1 ms to 200 ms, in particular 10 ms to 100 ms. Thus, a stoichiometric air-hydrogen mixture with a temperature of 860 K has an ignition delay time of 10 ms. A stoichiometric air-methane mixture at the same temperature has a much longer ignition delay time of a few seconds. In the embodiment with methane, a temperature of 1700 K is needed to achieve an ignition delay time of 10 ms.

Another important point is that the flow velocity (resulting from the cross-section area, density of the mixture, and sum of the mass flows of oxygen-containing gas and fuel) that develops in the reactor is greater than the turbulent flame velocity of the mixture. This prevents blowback of the flame to the fuel addition site.

Accordingly, in one embodiment of the present process, the homogeneous ignitable mixture (IM) has (or develops) a flow velocity $v_{IM}$ in the reactor that is greater than the turbulent flame velocity $v_F$ of the flame formed from the ignitable mixture (IM) in step d) through autoignition.

The flow velocity $v_{IM}$ of the oxygen-containing gas inflow stream may be in a range between 5 and 200 m/s, preferably between 10 and 100 m/s.

The turbulent flame velocity $v_F$ for lean combustion in air at 300 K is between 1 and 150 m/s with, for example, hydrogen or between 9 and 35 m/s with methane. It scales with the degree of turbulence, pressure, and temperature of the flow and can sometimes vary even further.

In addition, the flow velocity and ignition delay time give rise to a distance $x=v_{IM}*t_{ID}$ to the site at which the mixture burns and the flame accordingly stabilizes through autoignition. This distance x is preferably in the range from 0.01 m to 10 m, especially preferably in a range between 0.1 m to 2 m.

In one variant of the present process, the oxygen-containing gas used is air or a mixture of oxygen with at least one inert gas, in particular nitrogen, carbon dioxide, argon. The oxygen-containing gas is preheated; suitable heat sources may be a preflame, electric heating, heat exchanger or similar. It is preferable to use a preflame (for example a lean, swirl-stabilized natural gas flame) or a plasma generated by high voltage for this purpose, because not only is this able to achieve a high temperature, but active reaction intermediates (radicals) are also present in the mass flow, which have an additional beneficial effect on autoignition.

It is also possible to add a catalyst to the oxygen-containing gas or to the fuel or to selectively vary the gas mixture, which allows additional adjustment of the ignition delay time. If methane, for example, is used as the fuel, dimethyl ether or long-chain isoalkanes may be used to decrease the ignition delay time. An increase in the ignition delay time may be achieved, for example, by feeding inert gases, for example nitrogen, into the oxygen-containing gas. The associated reduction of the oxygen content in the ignitable mixture increases the ignition delay time. Moreover, a mixture of different fuel gases, for example hydrogen and methane, permits continuous variation of the ignition delay time between the values of the two individual gases.

The volume ratios in the addition of inert gases are limited by the ignitability of the mixture.

The temperature $T_I$ of the oxygen-containing gas inflow stream is in a range between 500-1500 K, preferably between 900-1400 K. The temperature of the gas inflow stream may, however, also be higher or lower than this, depending on the fuel (and solvent) used, enthalpy of vaporization, ignition temperature, equivalence ratio, and/or pressure. For example, long-chain hydrocarbons can ignite even at temperatures below 900 K, which would allow operation at lower temperatures, for example.

The fuel used may be a gaseous fuel and/or a liquid fuel. Gases such as hydrogen, natural gas, methane, propane, butane or other hydrocarbons are used as gaseous fuels. Suitable as liquid fuels are substances that either evaporate instantaneously or can be atomized very finely.

In a further variant of the present process, the fuel used may be an organic fuel preferably selected from the group comprising methanol, ethanol, isopropanol, other alcohols, tetrahydrofuran, 2-ethylhexanoic acid, acetonitrile, acetic acid, acetic anhydride, urea, N-methylurea, glycine, citric acid, stearic acid, and simple non-aliphatic hydrocarbons such as pentane, hexane, heptane, octane, nonane, decane, undecane, dodecane or aromatic hydrocarbons such as xylene. It is, however, generally possible to use other fuels too.

The fuel is introduced into the oxygen-containing gas stream at a temperature $T_F$ in a range between 250 and 1500 K, preferably between 300 and 500 K. The resulting temperature $T_{IM}$ of the ignitable mixture is accordingly below the temperature $T_I$ of the oxygen-containing gas inflow stream.

In one variant, hydrogen, for example, is added as fuel having a temperature of 300 K to the air inflow stream having a temperature of 1000 K, with the ignitable mixture that is formed having a temperature $T_{IM}$ of approx. 890 K. The resulting autoignition temperature $T_{AIM}$ for the ignition mixture is 770 K.

The air ratio A of the ignitable mixture states the amount of oxygen in the gas inflow stream relative to the amount of oxygen needed for oxidation of the fuel; a λ value greater than 1 indicates an excess of air and a λ value less than 1 indicates a deficiency of air. The range of possible air ratios is limited by the ignitability of the fuel-oxygen mixture and may be in a range between 0.1 and 25, preferably in a range between 0.5 to 10, especially preferably between 1 to 3.

Metal salts or metalorganic compounds may be used as precursors.

If a metal salt is used as precursor, the metal salt used is selected from the group comprising salts of aluminum, barium, bismuth, calcium, cerium, iron, magnesium, platinum, palladium, strontium, titanium, zirconium, manganese, chromium, zinc, copper, nickel, cobalt, yttrium, silver, vanadium, molybdenum or other metals. In one variant, precursors used include iron nitrate, aluminum triisopropoxide, zinc naphthenate or manganese nitrate. The use of metalloid salts, for example silicon salts, is also generally conceivable. The use of further metal salts or metalloid salts is likewise conceivable here.

If using metalorganic compounds as precursors, alkylated silicon compounds, for example tetraethyl orthosilicate, or alkylated titanium compounds, for example tetraisopropyl orthotitanate, may be used.

Furthermore, the combustion of the substance mixture may be carried out in the presence of nitrogen and/or in the presence of additives such as sodium azide or lithium nitride. In addition to the production of oxides, this also allows the production of nitrides.

Other additives that may be added to the mixture are viscosity modifiers (for example methanol, ethanol, isopropanol), surface modifiers (for example alkyl sulfates, alkyl sulfonates, fatty acids), emulsifiers (for example monoglycerides, polysaccharides) or stabilizers (for example polyalcohols, polyamines, polyacrylates, polyoxides).

In a further embodiment of the present process, the precursor-solvent mixture is injected/sprayed into the gas stream through at least one nozzle or atomizer. The mixture is finely atomized by the injection and the distance from the injection to the flame is chosen such that the mixture is not yet fully evaporated. If this is not the case, at high gas stream temperatures it is possible that only the solvent evaporates, with deposition of the precursor and consequent formation of large particles (spray drying).

The precursor-solvent mixture is preferably added at room temperature (300 K). However, in order to tailor the viscosity of the mixture to the technical limitations of the injector (for example nozzle cross-section area), the temperature may be varied, in particular increased (e.g. 500 K).

The precursor-solvent mixture may be injected using, for example, an ultrasonic atomizer or a pressure-controlled injection nozzle. Ultrasonic atomizers generate liquid droplets using a piezoelectric material that vibrates at ultrasonic frequencies in order to divide the liquid into small droplets. It is also possible to use pressure-controlled injection nozzles or other injector systems.

Injection nozzles are preferably used, which can produce a droplet size of 10-100 μm.

The solvent for the precursor-solvent mixture is preferably water or an organic solvent, for example alcohols (methanol, ethanol, isopropanol, etc.) or xylene. The choice of solvent depends primarily on the solubility of the precursor. It may be a solvent, for example water, that does not react further after evaporation and as an inert gas is not directly involved in the combustion or it may be solvents from the group of the abovementioned liquid fuels, which burn on combustion together with the gaseous fuel.

The concentration of the precursor in the precursor-solvent mixture results from the respective solubility limits of the precursor in the solvent used. The concentration of metal salts in water as solvent may thus be in a range between 0.1 molar and 1 molar. However, as stated, this depends on the specific precursor-solvent mixture.

The liquid precursor-solvent solution evaporates in the stabilized flame, with the high temperature in the stabilized flame resulting in the formation of nanoparticles. The nanoparticles produced are cooled using suitable methods (e.g., quenching) and collected, and then exit the production process.

The present process permits the production of nanoparticles in amounts greater than a few grams per hour (and thus above laboratory scale).

The nanoparticles produced have a particle diameter with a d95 value of less than 1000 nm, preferably less than 800 nm, especially preferably less than 500 nm. In the context of the proposed solution, the d95 value of, for example, 1000 nm, means that 95% of the particles of a population have a diameter of less than 1000 nm.

The nanoparticles formed have a unimodal size distribution, the shape of the nanoparticles being mostly, but not necessarily, spherical, uniform and homogeneous. The nanoparticles are characterized by a narrow size distribution with low standard deviation. Thus, in one embodiment, the population of nanoparticles produced has a standard deviation of less than 2.2, preferably less than 2.0, especially preferably less than 1.8.

The nanoparticles produced by the present process may be used in a variety of ways. Depending on their properties (such as transparent, electrically conductive, electrically insulating, thermally conductive or catalytically active), the nanoparticles may be used as coating materials, in electrical appliances, for heat conduction or thermal insulation or as catalysts, etc.

The process according to the proposed solution is executed in a reactor comprising the following:
  a first section A having at least one means of introducing an oxygen-containing gas stream;
  a second section B provided downstream of the first section A, having at least one means for introducing at least one fuel into the reactor;
  a third section C provided downstream of the first section A, having at least one means for injecting the at least one precursor-solvent mixture into the reactor;
  a fourth section D provided downstream of the second section B and third section C, for autoignition of the ignitable mixture of oxygen-containing gas and fuel; and
  a fifth section E provided downstream of section D, for the formation and removal from the reactor of the nanoparticles formed.

In one embodiment of the present reactor, the distance x between section B, in which the fuel is introduced, and section D, in which the autoignition of the ignitable mixture takes place, is given by the equation $x = v_{IM} * t_{ID}$.

BRIEF DESCRIPTION OF THE DRAWINGS

The proposed solution will be explained in more detail below on the basis of working examples with reference to the FIGURE.

FIG. 1 shows a schematic representation of a first embodiment of the present process.

DETAILED DESCRIPTION

FIG. 1 shows a schematic structure for an autoignition-stabilized flame for nanoparticle synthesis from a liquid spray.

In a first section A, a heated, preconditioned, oxygen-containing gas inflow stream having the temperature $T_I$ is provided in step 1. Preconditioning of the inflow stream can be achieved through, for example, an electric heater. Other options are to use a lean preflame, for example a lean, swirl-stabilized natural gas flame, or a plasma generated by high voltage. It is not just the resulting temperature of the inflow stream that plays a role here. Likewise, changing the concentration of oxygen through a preflame can cause an increase in the ignition delay time, whereas radicals present in the stream as a consequence of combustion or the plasma can drastically reduce the ignition delay time.

In section B, a preferably gaseous fuel is added to the hot gas stream in step 2, this being introduced such that the fuel mixes very rapidly with the gas to form a homogeneous mixture. Suitable fuels are hydrogen, natural gas, methane, propane, butane but also liquid fuels. Here it is essential that, after a short time or short travel distance in the reactor, there is always a homogeneous mixture present.

In step 3, an ignitable mixture is formed from the homogeneous mixture of oxygen-containing gas and fuel. Although the temperature of the resulting mixture is above the autoignition temperature of the mixture, combustion of the mixture does not occur instantaneously. This commences only once the ignition delay time $t_{ID}$ has elapsed, i.e. on reaching section D.

In section C of the reactor, the liquid precursor-solvent mixture is introduced through an atomization nozzle in step 4. The distance to the flame in section D of the reactor is chosen such that the liquid is not yet fully evaporated before reaching the flame. In the FIGURE, section C is shown downstream of section B; depending on the process design, section C may also be upstream of section B. The solvent used does not necessarily need to be flammable.

In section D, i.e. once the characteristic ignition delay time has elapsed, autoignition of the ignitable mixture of oxygen-containing gas and fuel takes place (step 5). In section D, the fuel and, if combustible, the solvent burn. The precursor for the nanoparticles preferably undergoes transition into the gas phase. This allows the precursor to undergo reaction (oxidation, reduction, pyrolysis, hydrolysis) and the solvent, if combustible, to release additional thermal energy through burning, as a result of which very high temperatures are locally achieved. Supercritical heating of liquid droplets and consequent explosive evaporation is also possible (Rosebrock et al., AIChE Journal, 2016, Vol. 62, 381-391). This mechanism also allows the formation of droplets of the precursor-solvent mixture that are smaller than one micrometer and thus the formation of nanoparticles without prior transition into the gas phase.

To ensure this process flow, precise preconditioning of the inflow stream is necessary. The temperatures and mass flows of the supplied substances must be controlled very stably to one value in order to keep the flame stable in one position. Although the theoretical ignition delay times can serve as a guide when setting the flame position under defined process conditions, optical access to the reactor to adjust and control the flame position has been found to be helpful in laboratory implementation.

In section E of the reactor, nanoparticles are formed in step 6, preferably by condensation from the gaseous phase during and after combustion, which are subsequently removed from the reactor in an appropriate manner. However, formation of particles directly from the liquid phase is also possible.

Working Example 1

An air inflow stream having a temperature of 1000 K is fed into the reactor. Hydrogen is added at an air ratio of 2 and a temperature of 300 K. This gives rise in the reactor to an air-hydrogen mixture having a temperature of 890 K. This mixture has an ignition delay of approx. 10 ms and a turbulent flame velocity of approx. 40 m/s. The flow velocity in the reactor is now given by the overall mass flow and the cross-section area and is set hereinafter at 80 m/s. This gives a travel distance x of 800 mm from the fuel injection (2) to the position of the flame (5). At a distance of 100 mm upstream of the flame, a 0.1 molar solution of iron(III) nitrate in ethanol is sprayed in at 300 K (4). This already reaches the flame after approx. 1 ms, which means that the drops will not yet have evaporated. In the flame, the liquid solution evaporates and the solvent burns, with the high temperatures resulting in the formation of $Fe_2O_3$ nanoparticles.

Working Example 2

An air inflow stream having a temperature of 1000 K is fed into the reactor. Hydrogen is added at an air ratio of 1.7 and a temperature of 300 K. This gives rise in the reactor to an air-hydrogen mixture having a temperature of 870 K. This mixture has an ignition delay of approx. 11 ms and a turbulent flame velocity of approx. 56 m/s. The flow velocity in the reactor is now given by the overall mass flow and the cross-section area and is set hereinafter at 100 m/s. This gives a travel distance x of 1100 mm from the fuel injection (2) to the position of the flame (5). At a distance of 100 mm upstream of the flame, a 0.1 molar solution of manganese(II) nitrate in isopropanol is sprayed in at 300 K (4). This already reaches the flame after approx. 1 ms, which means that the drops will not yet have evaporated. In the flame, the liquid solution evaporates and the solvent burns, with the high temperatures resulting in the formation of $Mn_2O_3$ nanoparticles.

Working Example 3

An air inflow stream having a temperature of 1000 K is fed into the reactor. Hydrogen is added at an air ratio of 2.5 and a temperature of 300 K. This gives rise in the reactor to an air-hydrogen mixture having a temperature of 910 K. This mixture has an ignition delay of approx. 8 ms and a turbulent flame velocity of approx. 24 m/s. The flow velocity in the reactor is now given by the overall mass flow and the cross-section area and is set hereinafter at 50 m/s. This gives a travel distance x of 400 mm from the fuel injection (2) to the position of the flame (5). At a distance of 100 mm upstream of the flame, a 0.1 molar solution of zinc naphthenate in ethanol is sprayed in at 300 K (4). This already reaches the flame after approx. 2 ms, which means that the drops will not yet have evaporated. In the flame, the liquid solution evaporates and the solvent burns, with the high temperatures resulting in the formation of ZnO nanoparticles.

Working Example 4

An air inflow stream having a temperature of 900 K is fed into the reactor. Hydrogen is added at an air ratio of 2.5 and a temperature of 300 K. This gives rise in the reactor to an air-hydrogen mixture having a temperature of 830 K. This mixture has an ignition delay of approx. 48 ms and a turbulent flame velocity of approx. 23 m/s. The flow velocity in the reactor is now given by the overall mass flow and the cross-section area and is set hereinafter at 50 m/s. This gives a travel distance x of 2400 mm from the fuel injection (2) to the position of the flame (5). At a distance of 100 mm upstream of the flame, a 0.1 molar solution of aluminum triisopropoxide in isopropanol is sprayed in at 300 K (4). This already reaches the flame after approx. 2 ms, which means that the drops will not yet have evaporated. In the flame, the liquid solution evaporates and the solvent burns, with the high temperatures resulting in the formation of $Al_2O_3$ nanoparticles.

Working Example 5

An air inflow stream having a temperature of 1400 K is fed into the reactor. Methane is added at an air ratio of 1.7 and a temperature of 300 K. This gives rise in the reactor to an air-methane mixture having a temperature of 1330 K. This mixture has an ignition delay of approx. 25 ms and a turbulent flame velocity of approx. 16 m/s. The flow velocity in the reactor is now given by the overall mass flow and the cross-section area and is set hereinafter at 30 m/s. This gives a travel distance x of 750 mm from the fuel injection (2) to the position of the flame (5). At a distance of 100 mm upstream of the flame, a 0.1 molar solution of tetraisopropyl orthotitanate in xylene is sprayed in at 300 K (4). This already reaches the flame after approx. 3 ms, which means that the drops will not yet have evaporated. In the flame, the liquid solution evaporates and the solvent burns, with the high temperatures resulting in the formation of $TiO_2$ nanoparticles.

Working Example 6

An air inflow stream having a temperature of 1300 K is fed into the reactor. Methane is added at an air ratio of 1.7 and a temperature of 300 K. This gives rise in the reactor to an air-methane mixture having a temperature of 1230 K. This mixture has an ignition delay of approx. 70 ms and a turbulent flame velocity of approx. 14 m/s. The flow velocity in the reactor is now given by the overall mass flow and the cross-section area and is set hereinafter at 30 m/s. This gives a travel distance x of 2100 mm from the fuel injection (2) to the position of the flame (5). At a distance of 100 mm upstream of the flame, a 0.1 molar solution of tetraethyl orthosilicate in isopropanol is sprayed in at 300 K (4). This already reaches the flame after approx. 3 ms, which means that the drops will not yet have evaporated. In the flame, the liquid solution evaporates and the solvent burns, with the high temperatures resulting in the formation of $SiO_2$ nanoparticles.

The invention claimed is:
1. A process for the production of nanoparticles from a liquid mixture comprising at least one precursor and at least one solvent in a reactor with continuous through-flow, comprising:
   a) feeding at least one oxygen-containing gas inflow stream having a temperature $T_I$ in a range between 900 and 1400 K and a flow velocity $v_{IM}$ of 5 to 200 m/s into a first section A of the at least one reactor, b) adding at least one fuel having a temperature $T_F$ in a range between 300 and 500 K to the oxygen-containing gas inflow stream, wherein the addition of the at least one fuel takes place in a second section B of the reactor provided downstream of the first section A, wherein the fuel and the oxygen-containing gas inflow stream form a homogeneous ignitable mixture having a temperature $T_{IM}$, wherein the temperature of the homogeneous ignitable mixture $T_{IM}$ is below the temperature $T_I$ of the oxygen-containing gas inflow stream and is above the autoignition temperature $T_{AIM}$ of the homogeneous ignitable mixture, wherein the air ratio λ of the ignitable mixture is in a range between 1 and 10, c) spraying at least one precursor-solvent mixture into the homogeneous ignitable mixture in a third section C of the reactor, d) autoignition of the ignitable mixture of oxygen-containing gas and fuel after an ignition delay time $t_{ID}$ of 1 ms to 200 ms in a fourth section D of the reactor provided downstream of the second section B and the third section C to form a stabilized flame with a turbulent flame velocity $v_F$, wherein the flow velocity $v_{IM}$ is greater than the turbulent flame velocity $v_F$ such that a blowback of the flame to the fuel addition site is prevented, and reacting the precursor-solvent mixture in the stabilized flame to form nanoparticles from the metal salt precursor, and e) removing the nanoparticles formed from the reactor.

2. The process as claimed in claim 1, wherein the homogeneous ignitable mixture has a flow velocity $v_{IM}$ in the reactor that is greater than the turbulent flame velocity $v_F$ of the flame formed from the ignitable mixture in step d) through autoignition.

3. The process as claimed in claim 1, wherein the flow velocity $v_{IM}$ of the oxygen-containing gas inflow stream is in a range between 10 and 100 m/s.

4. The process as claimed in claim 1, wherein the oxygen-containing gas used is air or a mixture of oxygen with at least one inert gas.

5. The process as claimed in claim 1, wherein the at least one fuel is a gaseous fuel and/or a liquid fuel.

6. The process as claimed in claim 1, wherein the air ratio λ of the ignitable mixture is in a range between 1 to 3.

7. The process as claimed in claim 1, wherein the at least one precursor is a metal salt selected from the group of aluminum, barium, bismuth, calcium, cerium, iron, magnesium, platinum, palladium, strontium, titanium, zirconium, manganese, chromium, zinc, copper, nickel, cobalt, yttrium, silver, vanadium, molybdenum or other metals or metalloids.

8. The process as claimed in claim 1, wherein the precursor-solvent mixture is injected/sprayed into the homogeneous ignition mixture through at least one nozzle or atomizer.

9. The process as claimed in claim 8, wherein the precursor-solvent mixture is injected using an ultrasonic atomizer or a pressure-controlled injection nozzle.

10. The process as claimed in claim 1, wherein the solvent for the metal salt-precursor-solvent mixture is selected from a group including water or an organic solvent.

11. The process as claimed in claim 1, wherein the ignition delay time $t_{ID}$ is in a range between 1 μs to 1 s.

12. The process as claimed in claim 1, wherein the nanoparticles produced have a particle diameter with a d95 value of less than 1000 nm.

13. The process as claimed in claim 1, wherein the oxygen-containing gas used is air or a mixture of oxygen with at least one inert gas selected from the group consisting of nitrogen, carbon dioxide, and argon.

* * * * *